US008089682B2

(12) United States Patent
Noh et al.

(10) Patent No.: US 8,089,682 B2
(45) Date of Patent: *Jan. 3, 2012

(54) ELECTROCHROMIC DEVICE USING POLYPHTHALATE AND PROCESS FOR PREPARING THE SAME

(75) Inventors: Chang Ho Noh, Suwon-si (KR); Seung Uk Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 69 days.

This patent is subject to a terminal disclaimer.

(21) Appl. No.: 12/042,197

(22) Filed: Mar. 4, 2008

(65) Prior Publication Data
US 2009/0097096 A1 Apr. 16, 2009

(30) Foreign Application Priority Data
Oct. 11, 2007 (KR) .................. 10-2007-0102464

(51) Int. Cl.
G02F 1/153 (2006.01)
(52) U.S. Cl. .................................... 359/273
(58) Field of Classification Search ............. 359/273
See application file for complete search history.

(56) References Cited

U.S. PATENT DOCUMENTS

| 4,340,624 | A | * | 7/1982 | Yamashita et al. ......... 313/483 |
| 4,537,826 | A | * | 8/1985 | Miyamura et al. ......... 428/328 |
| 4,550,982 | A | * | 11/1985 | Hirai ........................... 359/274 |
| 6,143,433 | A | | 11/2000 | Murata |
| 6,246,508 | B1 | * | 6/2001 | Yde-Andersen et al. ..... 359/270 |
| 7,244,864 | B2 | | 7/2007 | Anelli |
| 2006/0050357 | A1 | * | 3/2006 | Gavrilov et al. ............ 359/265 |
| 2007/0074316 | A1 | * | 3/2007 | Alden et al. ................. 977/762 |
| 2009/0078917 | A1 | * | 3/2009 | Percec et al. ................ 252/583 |
| 2009/0097096 | A1 | | 4/2009 | Noh |
| 2009/0251046 | A1 | * | 10/2009 | Son et al. .................... 313/504 |

FOREIGN PATENT DOCUMENTS

JP 63-196682 8/1988
WO 97/35227 9/1997

OTHER PUBLICATIONS

Hikaru Urano et al., "Electrochemical and spectroscopic characteristics of dimethyl terephthalate", Journal of Materials Chemistry, 2004, 14, pp. 2366-2368.
A.P. Hall, P. Hodge, C.S. McGrail, J.Rickerby, Synthesis of a series of cyclic oligo(alkylidene isophthalate)s by cyclo-depolymerisation, Polymer, 2000, vol. 41, pp. 1239-1249.
W. Sharmoukh, Kyoung Chul Ko, Ju Hong Ko, Hye Jin Mam, Duk-Young Jung, Changho Noh, Jin Yong Lee, and Swung Jk Son, 5-Substituted isophthalate-based organic electrochromic materials, Journal of Materials Chemistry, 2008, vol. 18, pp. 4408-4413.

* cited by examiner

*Primary Examiner* — Joseph P Martinez
(74) *Attorney, Agent, or Firm* — Cantor Colburn LLP (57) ABSTRACT

Example embodiments provide an electrochromic device using polyphthalate as an electrochromic material and a process for preparing the same. The electrochromic device in accordance with example embodiments enables the production of a solid nanoscale electrochromic device having a bistability using polyphthalate as an electrochromic material, and easy formation of a red electrochromic layer which was not reported in a conventional art. Accordingly, the electrochromic device of example embodiments can be usefully employed for fabrication of RGB color electrochromic displays.

13 Claims, 2 Drawing Sheets

ELECTROCHROMIC DEVICE USING POLYPHTHALATE AND PROCESS FOR PREPARING THE SAME

PRIORITY STATEMENT

This application claims priority under U.S.C. §119 to Korean Patent Application No. 10-2007-102464, filed on Oct. 11, 2007, in the Korean Intellectual Property Office (KIPO), the entire contents of which are incorporated herein by reference.

BACKGROUND OF THE INVENTION

1. Field of the Invention

Example embodiments relate to an electrochromic device using polyphthalate as an electrochromic material and a process for preparing the same. More specifically, example embodiments relate to an electrochromic device comprising electrodes, an electrochromic layer and an electrolyte layer, wherein the electrochromic layer includes polyphthalate, and a process for preparing the same.

2. Description of the Related Art

Electrochromism is the phenomenon displayed by some chemical species of reversibly changing color when a voltage is applied. A material capable of undergoing reversible changes of optical properties by the electrochemical redox reaction accompanying such electrochromic properties is called an electrochromic material. That is, the electrochromic material does not have a color when no electric field is applied from an external source and then has a certain color when the electric field is applied, and vice versa. Examples of the electrochromic materials may include inorganic compounds such as tungsten oxides, molybdenum oxides, and the like, and organic compounds such as pyridines, aminoquinones, and the like.

Thus, electrochromic devices taking advantage of such an electrochromic phenomenon have various advantages such as high reflectivity without a need for an external light source, excellent flexibility and portability, and the feasibility of weight reduction, and are therefore expected to have promising applications for various flat-panel displays (FPDs). In particular, the electrochromic polymer materials are receiving a great deal of attention, due to high applicability to E-paper which is recently under intensive research and study, as an electronic medium capable of replacing paper.

As the electrochromic material, an inorganic compound or an organic compound is usually employed. Specific examples of the inorganic compound may include tungsten oxides, molybdenum oxides, iridium oxides, Prussian blue, and the like. Specific examples of the organic compound may include rare-earth compounds, phthalocyanine, ruthenium complex, viologen, and the like. In particular, WO 97/035227 discloses electrochromic devices using viologen as an organic electrochromic material, wherein application of an electric field between both electrodes of the electrochromic device results in color changes of viologen molecules via the reaction of the viologen molecules with ions or electrons in an electrolyte.

That is, viologen electrochromism is dependent upon oxidation-reduction (redox) reactions. Upon transfer of electrons to viologen molecules from the electrolyte, the viologen undergoes one-electron reduction to provide a colored radical cation yielding a blue color, which will emit a yellow color upon further accepting of electrons from an electron donor.

The electrochromic device disclosed in WO 97/035227 is known to have a fast electrochromic response speed and a high contrast ratio, and an excellent bistability which is a memory property capable of maintaining an electrochromic property even after a power source applied to an electrochromic material is off. However, even though blue and green electrochromic materials are known in such a nano-electrochromic type, red electrochromic materials are not yet known.

Meanwhile, Chiba University (J. Mater. Chem., 2004, 14, 2366-2368, Chiba University/Hitachi Chemical Co., Ltd.) discloses an electrochromic device utilizing dimethyl terephthalate as an electrochromic material. However, this type of the electrochromic device suffers from no bistability, resulting from rapid electrical neutralization of the electrochromic material when a power source is off, due to use of a solution type of an electrochromic material in which the electrochromic material is dissolved in an electrolyte solution.

SUMMARY OF THE EXAMPLE EMBODIMENTS

Therefore, example embodiments have been made in view of the problems of the prior art and it is one object of example embodiments to provide an electrochromic device comprising polyphthalate as an electrochromic material, which has excellent properties and performance such as high memory properties and a fast electrochromic response speed and can also be prepared by a simplified manufacturing process.

Example embodiments also provide an electrochromic device using a solid phthalate compound, such that a polyphthalate electrochromic material can have a bistability.

Example embodiments further provide a process for preparing the aforesaid electrochromic device.

BRIEF DESCRIPTION OF THE DRAWINGS

Example embodiments will be more clearly understood from the following detailed description taken in conjunction with the accompanying drawings. FIGS. 1-4 represent non-limiting, example embodiments as described herein.

DETAILED DESCRIPTION OF THE PREFERRED EXAMPLE EMBODIMENTS

In accordance with example embodiments, the above and other objects can be accomplished by the provision of an electrochromic device comprising a pair of a transparent electrode and an opposite electrode, which are disposed opposite to each other, and an electrochromic material and an electrolyte between the transparent electrode and the opposite electrode, wherein the electrochromic material includes polyphthalate.

In accordance with other example embodiments, there is provided an electrochromic device comprising a transparent electrode having a conductive film formed on a transparent substrate, an opposite electrode disposed opposite to the transparent electrode and having a conductive film formed on a substrate, an electrochromic layer of a polyphthalate electrochromic material formed on the transparent electrode, and an electrolyte interposed between the transparent electrode and the opposite electrode.

In accordance with other example embodiments, there is provided a process for preparing an electrochromic device comprising a transparent electrode, an opposite electrode, and an electrochromic material and an electrolyte between the transparent electrode and the opposite electrode, wherein the electrochromic layer is formed of a polyphthalate electrochromic material.

Therefore, example embodiments enable the production of a solid nano-electrochromic device having a bistability, and easy formation of a red electrochromic layer which was not reported in a conventional art. Accordingly, the electrochromic device of example embodiments can be usefully employed for fabrication of a Red, Green, Blue (RGB) color electrochromic displays.

Hereinafter, example embodiments will be described in detail with reference to the attached drawings.

The electrochromic device in accordance with example embodiments employs polyphthalate as an electrochromic layer-forming material, and exhibits a solid phase such that the polyphthalate has a bistability. Further, the electrochromic device of example embodiments allows easy formation of a red electrochromic layer.

Figure 1:
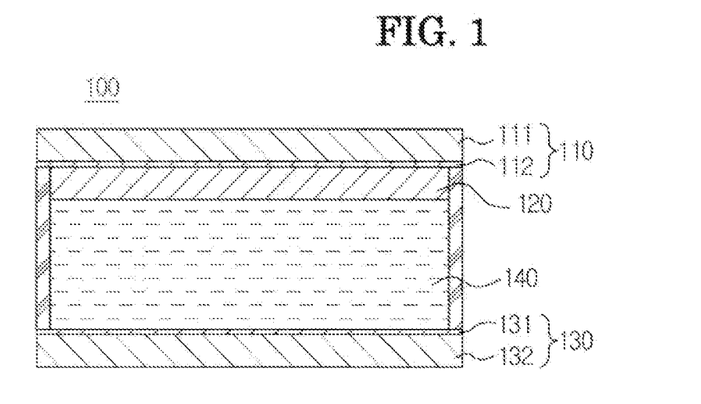
FIG. 1 is a schematic cross-sectional view of an electrochromic device in accordance with example embodiments.

FIG. 1 is a schematic cross-sectional view of an electrochromic device in accordance with example embodiments. As shown in FIG. 1, an electrochromic device 100 includes a pair of a transparent electrode 110 and an opposite electrode 130 being disposed opposite to each other, and an electrochromic material 120 and an electrolyte 140 between the transparent electrode and the opposite electrode, wherein the electrochromic material 120 includes polyphthalate.

Referring to FIG. 1, the electrochromic device 100 may include the transparent electrode 110 having a conductive film 112 formed on a transparent substrate 111, the opposite electrode 130 disposed opposite to the transparent electrode 110 and having a conductive film 132 formed on a substrate 131, the electrochromic layer 120 of a polyphthalate electrochromic material formed on the transparent electrode 110, and the electrolyte 140 interposed between the transparent electrode 110 and the opposite electrode 130.

Examples of monomers constituting the polyphthalate electrochromic material that can be used in example embodiments may include, but are not limited to, monomers represented by Formula 1 below.

Polyphthalate is a monomer which is formed by polymerization of one or more ortho, meta or para-phthalate compounds represented by Formula 1.

(Formula 1)

wherein $R_1$, $R_2$, $R_3$ and $R_4$ are independently hydrogen, hydroxy, linear, branched or cyclic $C_1$-$C_{10}$ alkyl, $C_1$-$C_{10}$ alkoxyalkyl, linear, branched or cyclic $C_1$-$C_{10}$ alkoxy, $C_6$-$C_{12}$ aryl, $C_2$-$C_{12}$ heteroaryl, nitro, or amino, and

$n_1$ and $n_2$ are each an integer of 1 to 10.

Examples of the phthalate compound that can be used in example embodiments may include compounds represented by Formula 2 below.

(Formula 2)

Examples of the aforesaid polyphthalates may be represented by Formula 3 below, $$\left[ \underset{n1}{\overset{}{\text{≈}}}\!\!-\!\!O\underset{R_3}{\overset{R_1}{\underset{}{\bigg|}}}\!\!\underset{R_4}{\overset{R_2}{\underset{}{\bigg|}}}\!\!O\!-\!\underset{n2}{\text{≈}} \right]_{n3}$$ (Formula 3)

wherein $R_1$, $R_2$, $R_3$ and $R_4$ are independently hydrogen, hydroxy, linear, branched or cyclic $C_1$-$C_{10}$ alkyl, $C_1$-$C_{10}$ alkoxyalkyl, linear, branched or cyclic $C_1$-$C_{10}$ alkoxy, $C_6$-$C_{12}$aryl, $C_2$-$C_{12}$ heteroaryl, nitro, or amino, $n_1$ and $n_2$ are each an integer of 1 to 10, and $n_3$ is an integer of 1 to 1000.

Preferably, a weight average molecular weight of the polyphthalate may be in a range of $10^2$ to $10^7$ Da.

In example embodiments, the conductive films 112, 132 formed on the transparent electrode 110 and the opposite electrode 130 may form a positive or negative electrode portion, and vice versa.

In example embodiments, the electrochromic layer 120 may be formed by coating an electrochromic material polyphthalate on the transparent electrode. There is no particular limit to a coating method. For example, coating may be carried out by any conventional method selected from the group consisting of screen printing, printing, spin coating, dipping, and ink jet spray.

Preferably, a thickness of the electrochromic layer 120 is in a range of 0.1 to 20 μm.

Upon application of a voltage between the transparent electrode 110 and the opposite electrode 130, terephthalic acid reacts with ions or electrons in an electrolyte, thereby undergoing a change of color thereof.

In an electrochromic device in accordance with other example embodiments, the electrochromic layer, as will be illustrated hereinafter, may be comprised of a plurality of nanocrystalline particles and polyphthalate electrochromic materials adsorbed to surfaces of nanocrystalline particles.

Figure 2:
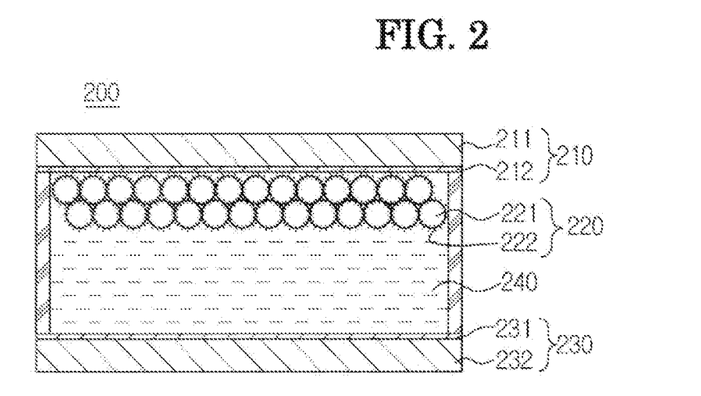
FIG. 2 is a schematic cross-sectional view of an electrochromic device in accordance with other example embodiments.

FIG. 2 is a schematic cross-sectional view of an electrochromic device in accordance with other example embodiments. As shown in FIG. 2, an electrochromic device 200 includes a transparent electrode 210 having a conductive film 212 formed on a transparent substrate 211, an opposite electrode 230 disposed opposite to the transparent electrode 210 and having a conductive film 232 formed on a substrate 231, an electrochromic layer 220 formed on the transparent electrode 210, and an electrolyte 240 interposed between the transparent electrode 210 and the opposite electrode 230, wherein the electrochromic layer is comprised of a nanocrystalline layer 221 of nanocrystals formed on the conductive film 212 and polyphthalate adsorbed to the nanocrystalline layer 221.

The nanocrystalline layer 221 may be composed of a plurality of nanocrystalline particles 121 on the conductive film 112, and the electrochromic layer 120 may be formed by adsorption, coating, supporting or attachment of the electrochromic material on the nanocrystalline particles.

The adsorption, coating, supporting or attachment of the electrochromic material on the nanocrystalline particles may be carried out by a linker.

The electrochromic layer 120 may be comprised of:
the nanocrystalline layer 221;
the linker attached or adsorbed to the nanocrystalline particles 121; and
the electrochromic material 222 bound to the linker.

The nanocrystalline particles that can be used in example embodiments may be nanocrystals having various electrical properties of a semiconductor material. Preferably, examples of nanocrystals may include, but are not limited to, titanium dioxide ($TiO_2$), zinc oxide (ZnO), tungsten oxide (WO) and the like.

The nanocrystalline particles may have various shapes such as sphere, square, cylinder, bar, triangle, disk, tripod, tetrapod, calve, box, star, and tube-like shapes.

Preferably, a size of the nanocrystalline particles is in a range of 5 to 500 nm and a thickness of the electrochromic layer 220 including the nanocrystalline layer 221 is in a range of 0.1 to 20 μm. The linker that can be used in Example embodiments may include one or more of the following functional group. such as phosphonic acid, acetic acid, sulfonic acid, catechol, salicylic acid or any combination thereof, but are not limited thereto.

A preferred example of the linker can be represented by formula 4 below.

(Formula 4)

wherein $n_3$ is an integer of 1 to 5.

As the linker is adsorbed via strong interaction with the nanocrystalline particles, the linker serves as a mediator to immobilize the phthalate compound or a polymerization product thereof onto the nanocrystalline layer.

As in Example embodiments, immobilization of the nanocrystalline layer on the conductive film, and immobilization of polyphthalate as the electrochromic material on the nanocrystalline layer are achieved through the medium of the linker, so the electrochromic material can be present in a solid state other than a solution state. As a result, the electrochromic device having such a configuration may have a bistability.

The transparent substrates 211, 231 that can be used in example embodiments may include, but are not limited to, transparent inorganic substrates such as quartz and glass, and transparent plastic substrates such as polyethylene terephthalate (PET), polyethylene naphthalate (PEN), polycarbonate, polystyrene, polypropylene and the like. Preferred is a flexible substrate.

Further, there is no particular limit to materials for the conductive films 212, 232 coated on the transparent substrate 211, 231, as long as they are conductive materials having transparency. Specific examples of the conductive film materials may include, but are not limited to, indium-tin oxide (ITO), fluorine-doped tin oxide (FTO), and conductive polymers such as phenylpolyacetylenes and polythiophenes.

Further, a counter material layer is preferably formed on the conductive film 132 of the opposite electrode 230 in order to efficiently carry out an electrochemical reaction of the electrochromic material. Examples of a material for the counter layer may include, but are not limited to, antimony-doped tin oxide (ATO), ITO (Indium Tin Oxide), and the like. Further, there is no particular limit to materials for the conductive film 232 of the opposite electrode 230, as long as they are conductive materials which are not necessary to be transparent.

As the electrolyte 140 used in Example embodiments, known materials may be employed without any particular limitation. Specific examples of the electrolyte materials may include solutions of lithium salts, potassium salts, sodium salts, and the like. More particularly, a tetrabutylammonium hexafluorophosphate or $LiClO_4$ solution may be used without being limited thereto.

When the polyphthalate is directly coated on the transparent electrode to form an electrochromic layer, it is more preferred to use a gel electrolyte such as a complex of poly(vinyl pyrrolidinone) and tetrabutylammonium perchlorate, or polymethylmethacrylate (PMMA).

The electrochromic device in accordance with example embodiments may further comprise a reflective layer which is formed on the opposite electrode. The reflective layer may be made of a known material which is not particularly limited. Specific examples of the reflective layer material may include, but are not limited to, $TiO_2$, $BaSO_4$, $Al_2O_3$, ZnO, and MgO.

Hereinafter, a process for preparation of the electrochromic device in accordance with example embodiments will be illustrated in more detail.

Other example embodiments provide a process for preparing an electrochromic device comprising a transparent electrode, an opposite electrode, and an electrochromic material and an electrolyte between the transparent electrode and the opposite electrode, wherein the electrochromic layer is formed of polyphthalate.

The process for preparing the electrochromic device in accordance with example embodiments includes:
i) forming conductive films on substrates to prepare a transparent electrode and an opposite electrode, respectively;
ii) forming an electrochromic layer including polyphthalate on the conductive film of the transparent electrode; and
iii) assembling the transparent electrode and the opposite electrode and injecting an electrolyte between two electrodes.

In this connection, materials used in the process of example embodiments may be the same materials as described in the aforesaid electrochromic device.

Hereinafter, individual steps for the process of example embodiments will be illustrated in more detail.

i) Fabrication of transparent electrode and opposite electrode

According to a known method, this step can be carried out by forming conductive films on substrates to thereby prepare a transparent electrode and an opposite electrode, respectively.

ii) Formation of Electrochromic Layer on Conductive Film Of Transparent Electrode Polyphthalate as an electrochromic material is coated to form an electrochromic layer on the transparent electrode.

The electrochromic layer may be made as a solid phase formed only of a polymer. More preferably, a gel electrolyte may be used.

For example, the electrochromic layer may be formed by mixing polyphthalate with a gel electrolyte such as a complex of poly(vinyl pyrrolidinone) and tetrabutylammonium perchlorate or polymethylmethacrylate (PMMA), and coating the resulting mixture on a transparent substrate, followed by heat treatment for 1 hour to 1 week at room temperature to 150° C.

The coating method is the same as described above, and thus will be omitted herein.

iii) Assembly of Transparent Electrode and Opposite Electrode and Injection of Electrolyte into Electrode Assembly The transparent electrode and opposite electrode as thus fabricated are assembled by an alignment process, and an electrolyte is injected using a capillary phenomenon. Here, a fabrication and assembly method of the transparent electrode and the opposite electrode is not limited to the aforementioned method. Therefore, any conventional method known in the art may be employed without particular limitation. Then, an upper substrate and a lower substrate of the electrodes being opposite to each other are adhesively sealed to thereby complete an electrochromic device.

In other example embodiments, the electrochromic layer may be formed using nanocrystalline particles.

In this case, ii) formation of the electrochromic layer includes forming a nanocrystalline layer composed of a plurality of nanocrystalline particles on the conductive film of the transparent electrode and forming the electrochromic layer on the nanocrystalline layer.

Formation of the nanocrystalline layer is a step of forming a nanocrystalline layer composed of a plurality of nanocrystalline particles on the conductive film of the transparent electrode. Formation methods of the nanocrystalline layer may include, but are not limited to, vapor deposition, ion plating, sputtering, Molecular Beam Epitaxy (MBE).

Next, the electrochromic layer of a phthalate compound is formed on the nanocrystalline layer. In order to ensure that the phthalate compound has a bistability while maintaining electrochromic properties, the electrochromic material should be maintained in a solid state.

For this purpose, the phthalate compound or polyphthalate is combined with phosphonic acid and the resulting structure is immobilized on a nanocrystalline layer.

That is, an introduction method of a phosphoric acid group into the phthalate compound or polyphthalate is known which involves introduction of —P(=O)OR)$_2$, followed by hydrolysis under acidic conditions. However, as the phthalate compound used in Example embodiments is a material having an ester bond, hydrolysis of that compound results in first hydrolysis of the ester bond as shown in Reaction Scheme 1 below. Therefore, it is difficult to introduce the phosphonic acid group.

Reaction Scheme 1

In the process of Example embodiments, in order to avoid the problem as shown in Reaction Scheme 1, phosphonic acid is bound to the phthalate compound which is then immobilized on the nanocrystalline layer.

Specifically, the electrochromic layer can be prepared by a process including the following steps:

(1) dissolving a linker in a first solvent, and dipping the transparent electrode on which the nanocrystalline layer is formed in the first solvent to thereby adsorb the linker on the nanocrystalline layer;

(2) drying the transparent electrode;

(3) reacting the phthalate compound with the linker and polymerizing the phthalate compound, or reacting polyphthalate with the linker; and (4) drying the transparent electrode.

(1) Adsorption of Linker on Nanocrystalline Layer

The linker can be adsorbed on the nanocrystalline layer by dissolving the linker in a first solvent, and dipping the transparent electrode having the nanocrystalline layer formed thereon in the first solvent.

Figure 3:
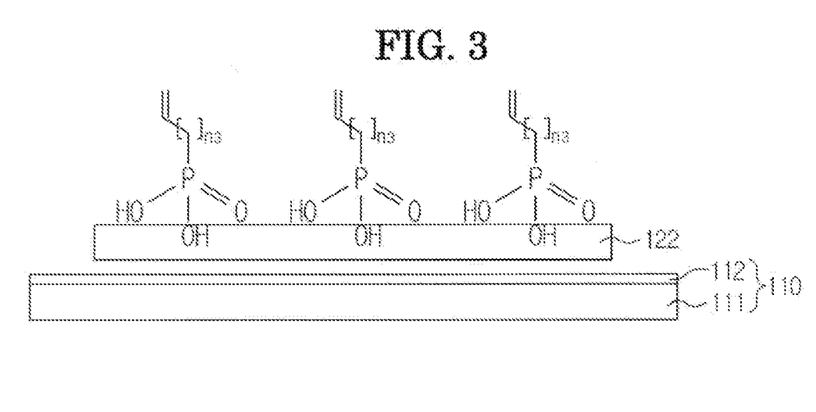
FIG. 3 is a schematic view illustrating adsorption of a linker to a nanocrystalline layer in a step of forming an electrochromic layer during a process for preparing an electrochromic device in accordance with example embodiments.

FIG. 3 is a schematic view illustrating adsorption of a linker to a nanocrystalline layer in a step of forming an electrochromic layer during a process for preparing an electrochromic device in accordance with example embodiments. Referring to FIG. 3, it can be seen that hydroxy or oxygen of the linker is adsorbed or attached via strong interaction with the nanocrystalline particles.

There is no particular limit to the first solvent, as long as it can dissolve the linker. Preferably, there may be used acetone, alcohol, nitromethane, methylene chloride, tetrahydrofuran, acetonitrile, nitromethane, and the like.

(2) Drying of Transparent Electrode

After a period of time, the dipped transparent electrode was taken from the first solvent and dried. There is no particular limit to the drying method.

(3) Reaction

This step includes reacting of the phthalate compound with the linker and polymerizing the phthalate compound, or reacting polyphthalate with the linker. In this manner, the phthalate compound or polyphthalate as the electrochromic material is immobilized on the nanocrystalline layer through the medium of the linker to thereby form an electrochromic layer.

Figure 4:
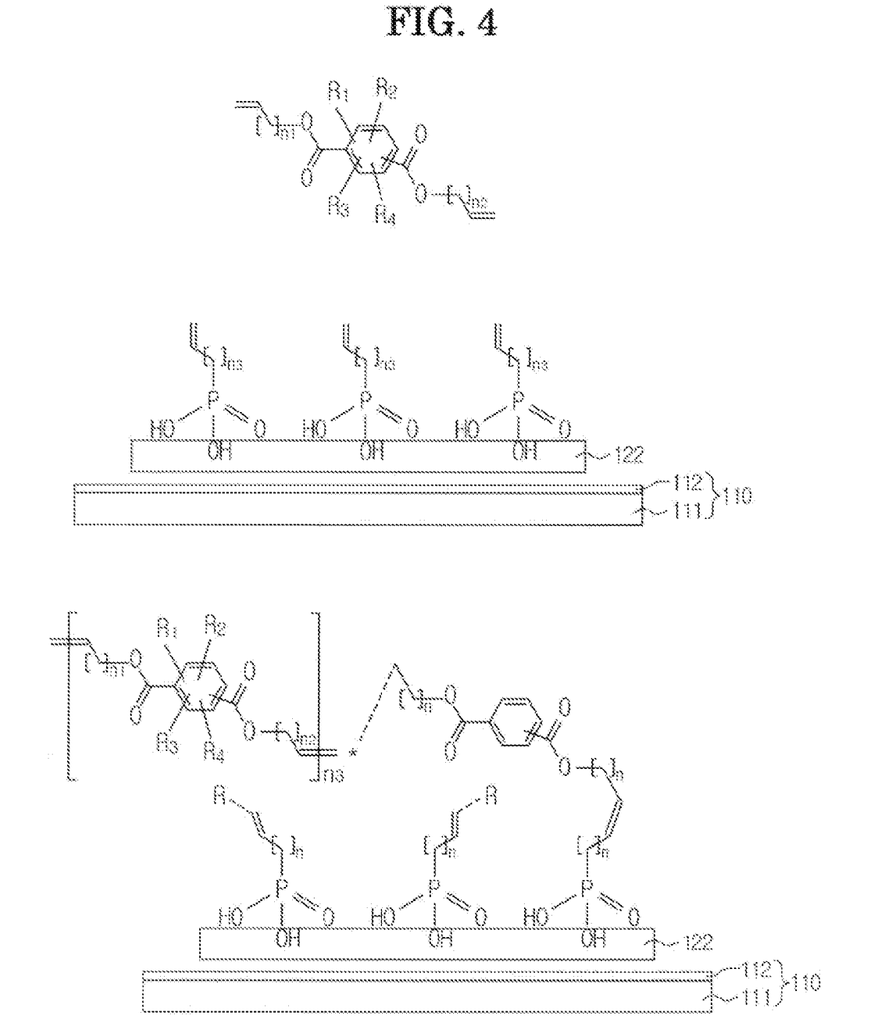
FIG. 4 is a schematic view illustrating reaction steps of a linker with a phthalate compound in a step of forming an electrochromic layer during a process for preparing an electrochromic device in accordance with example embodiments; and It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

FIG. 4 is a schematic view illustrating reaction steps of a linker with a phthalate compound in a step of forming an electrochromic layer during a process for preparing an electrochromic device in accordance with example embodiments. Although not shown in FIG. 4, the previously polymerized polyphthalate and the linker may be combined to form an electrochromic layer.

More specifically, the above reaction step may be carried out by adding a catalyst and the phthalate compound or polyphthalate to a second solvent, and dipping the dried transparent electrode in the second solvent.

There is no particular limit to the second solvent. For example, the second solvent may be at least one selected from the group consisting of toluene, methylene chloride, xylene, propylene glycol monomethyl ether acetate, benzene, acetone, acetonitrile, nitromethane, methylethylketone, tetrahydrofuran, dimethylformaldehyde and any combination thereof.

Methylene chloride, tetrahydrofuran, acetonitrile, and nitromethane may be used as both of first and second solvents.

Referring to FIG. 4, a metathesis reaction using a Grubbs catalyst may take place between alkene groups of the phthalate compound and alkene groups of a phosphonic acid derivative as the linker. This reaction leads to formation of a double bond between the linker and the (poly)phthalate compound, and also induction of polymerization between phthalate compounds, thereby forming a polymer layer. The polymerization of monomers via olefin metathesis leads to formation of double bonds between the monomers, but the thus-formed bonds are internal double bonds which undergo poor polymerization therebetween. When the polymer is formed, both ends of the polymer have original terminal double bonds where the reaction takes place. Therefore, it is considered that the polymerization between the polymers is also end-to-end polymerization. Further, polymerization of the polymer with the linker takes place between the terminal double bonds of the polymers and the terminal double bonds of the linker.

The aforesaid catalyst is preferably a Grubbs catalyst. Examples of such a catalyst may include first- and second-generation Grubbs catalysts represented by Formula 5, and variants thereof.

(Formula 5)

Grubbs. 1992

Grubbs, 1995
1st generation Grubbs
commercially available

Grubbs, 1999
2nd generation Grubbs
commercially available

The above reaction is preferably carried out at a temperature of 0 to 150° C. for 30 min to 7 days.

The transparent electrode subjected to the above reaction step is taken from the solvent and dried to form an electrochromic layer.

Meanwhile, preparation of polyphthalate via previous polymerization of the phthalate compound may be carried out by a conventional method known in the art, or otherwise polyphthalate having a molecular weight of $10^2$ to $10^7$ Da is currently commercially available on the market. Preferred is polyphthalate having a molecular weight of $10^3$ to several $10^6$ Da.

EXAMPLES

Now, the present invention will be described in more detail with reference to the following examples. These examples are provided only for illustrating the present invention and should not be construed as limiting the scope and spirit of the present invention.

Preparation Example 1

Phthalate FM-1

Terephthalic acid (0.92 mmol) was added to 3 mL, of $SOCl_2$, and stirred for 6 hours. $SOCl_2$ was removed under vacuum and the residue was dried. 5 mL of methylene chloride, 1 mL of pyridine, and 3 equivalents of an allyl alcohol (2-propene-1-ol) were added to the dried material which was then stirred for 2 hours. The resulting reaction solution was extracted with an aqueous $NH_4Cl$ solution and methylene chloride. Using $MgSO_4$, water was then removed from the methylene chloride solution, followed by column chromatography separation. The resulting product was dried under vacuum to give a phthalate compound (FM-1) of the following formula.

The ¹H NMR results are given as follows.
¹H NMR of FM-1 (CDCl₃, 300 MHz)
δ8.11 (4H, S), 6.05 (2H, m), 5.40 (2H, d, J=17 Hz), 5.30 (2H, d, J=10 Hz), and 4.84 (4H, d, J=5.7 Hz)

The following phthalate compounds FM-2 to FM-11 were prepared in the same manner as in synthesis of FM-1. The ¹H NMR spectral results are given as follows.

Preparation Example 2

Phthalate FM-2

The following phthalate compound FM-2 was prepared in the same manner as in Preparation Example 1, except that 4-penten-1-ol was added as an allyl alcohol.

The results of ¹H NMR are given as follows.
¹H NMR of FM-2 (CDCl₃, 300 MHz)
δ8.12 (s, 4H), 5.86 (m, 2H), 5.11-5 (t, J=1.5 Hz, 4H), 4.43-4.34 (t, J=6.6 Hz, 4H), 2.26-2.19 (q, J=7.2, 6.6 Hz, 4H), and 1.94-1.78 (q, J=6.6, 6.9 Hz, 4H)

Preparation Example 3

Phthalate FM-3

The following phthalate compound FM-3 was prepared in the same manner as in Preparation Example 1, except that 5-hexene-1-ol was added as an allyl alcohol.

The ¹H NMR results are given as follows.
1H NMR of FM-3 (CDCl₃, 300 MHz)
δ 8.11 (S, 4H), 5.8-5.07 (m, 2H), 5.07-4.96 (t, 4H), 4.41-4.33 (t, 4H), 2.17-2.09 (q, 4H), 1.85-1.75 (q, 4H), and 1.6-1.53 (q, 4H)

Preparation Example 4

Phthalate FM-4

The following phthalate compound FM-4 was prepared in the same manner as in Preparation Example 1, except that 3 mL of mono-methyl-terephthalate (0.45 mmol) was added instead of 3 mL of terephthalic acid (0.92 mmol), and 2 equivalents of an allyl alcohol was added.

The ¹H NMR results are given as follows.
¹H NMR of FM-4 (CDCl₃, 300 MHz)
δ8.12 (4H, s), 6.04 (1H, m), 5.43 (1H, d, J=17 Hz), 5.32 (1H, d, J=11 Hz) 4.85 (2H, d, J=5.7 Hz), and 3.95 (3H, s)

Preparation Example 5

Phthalate FM-5

The following phthalate compound FM-5 was prepared in the same manner as in Preparation Example 1, except that 3 mL of iso-terephthalic acid (0.92 mmol) was added instead of 3 mL of terephthalic acid (0.92 mmol).

The ¹H NMR results are given as follows.
¹H NMR of FM-5 (CDCl₃, 300 MHz)
δ 8.73 (1H, s), 8.26 (2H, d, J=7.8 Hz), 7.55 (1H t, J=7.8 Hz), 6.05 (2H, m), 5.43 (2H, d, J=17 Hz), 5.31 (2H, d, J=10 Hz), and 4.86 (4H, d, J=5.7 Hz)

Preparation Example 6

Phthalate FM-6

The following phthalate compound FET-6 was prepared in the same manner as in Preparation Example 5, except that 4-penten-1-ol was added as an allyl alcohol.

The results of $^1$H NMR are given as follows.
$^1$H NMR of FM-6 (CDCl$_3$, 300 MHz)
δ 8.69 (s, 1H), 8.24 (d, J=1.5 Hz, 2H), 7.56 (t, J=7.8 Hz, 1H), 5.86 (m, 2H), 5.11-5 (t, 4M), 4.39 (t, J=6.6 HZ), 2.27-2.12 (q, J=7.5 Hz, 4H), and 1.92-1.85 (q, J=6.9 Hz, 4H)

Preparation Example 7

Phthalate FM-7

The following phthalate compound FM-7 was prepared in the same manner as in Preparation Example 5, except that 5-hexene-1-ol was added as an allyl alcohol.

The results of $^1$H NMR are given as follows.
$^1$H NMR of FM-7 (CDCl$_3$, 300 MHz)
δ 8.68 (s, $^1$H), 8.24-8.21 (d, J=1.8 Hz, 2H), 7.55 (t, J=7.8, 7.5, 1H), 5.86-5.77 (m, 2H), 5.07-4.95 (t, J-1.8 Hz, 4H), 4.38 (t, J=6.6 Hz, 4H), 2.17-2.1 (q, J=1.2 Hz, 4H), 1.8-1.76 (q, J=6.9, 6.6 Hz, 4H), 1.61-1.51 (q, J=7.5, 2.4 Hz, 4H) δ 8.73 ($^1$H, s), 8.26 (2H, d, J=7.8 Hz), 7.55 ($^1$H, t, J=7.8 Hz), 6.05 (2H, m), 5.43 (2H, d, J=17 Hz), 5.31 (2H, d, J=10 Hz), and 4.86 (4H, d, J=5.7 Hz)

Preparation Example 8

Phthalate FM-8

The following phthalate compound FM-8 was prepared in the same manner as in Preparation Example 1, except that 3 mL of 2-nitro-terephthalic acid (0.92 mmol) was added to SOCl$_2$, instead of 3 mL of terephthalic acid (0.92 mmol).

The $^1$H NMR results are given as follows
$^1$H NMR of FM-8 (CDCl$_3$, 300 MHz)
δ 8.55 (d, J=1.5 Hz, 1H), 8.33 (d, J=1.5 Hz, $^1$H), 7.81 (d, J=8.1 Hz), 5.9-6.17 (m, 2H), 5.44-5.28 (m, 4H), and 4.87-4.81 (dd, J=1.2 Hz)

Preparation Example 9

Phthalate FM-9

The following phthalate compound FM-9 was prepared in the same manner as in Preparation Example 8, except that 4-penten-1-ol was added as an allyl alcohol.

The $^1$H NMR results are given as follows.
$^1$H NMR of FM-9 (CDCl$_3$, 300 MHz)
δ 8.5 (s, $^1$H), 8.31 (d, J=1.5 Hz, $^1$H), 7.8 (d, J=7.8 Hz, 1H) 5.86-5.74 (m, 2H), 5.08 (t, J=1.5 Hz, 4H), 4.44-4.32 (J=5.4 Hz, 4H), 2.21-2.1 (J=6.9 Hz, 4H), and 1.95-1.73 (J=6.9, 6.6 Hz, 4H)

Preparation Example 10

Phthalate FM-10

The following phthalate compound FM-10 was prepared in the same manner as in Preparation Example 8, except that 5-hexene-1-ol was added as an allyl alcohol.

The $^1$H NMR results are given as follows.
$^1$H NMR of FM-10 (CDCl$_3$, 300 MHz)
δ 8.5 (s, $^1$H), 8.3 (d, J=7.8 Hz, $^1$H), 7.8 (d, J=7.8 Hz, 1H), 5.82-5.74 (m, 2H), 5.04 (t, J=5.7 Hz, 4H), 4.37 (q, J, 6.6 Hz, 4H), 2.15 (t, J=7.2 Hz, 4H), 1.84 (J=6.6 Hz, 4H), and 1.57-1.42 (J=7.8 Hz, 4H)

Preparation, Example 11

Phthalate FM-11

The following phthalate compound FM-11 was prepared in the same manner as in Preparation Example 1, except that 3-methyl-3-butene-1-ol was added as an allyl alcohol.

The $^1$H NMR results are given as follows.
$^1$H NMR of FM-11 (CDCl$_3$, 300 MHz)
δ 8.06 (s, 4H), 4.8 (d, J=10.2, 4H), 4.46 (t, J=6.6 Hz, 4H), 2.47 (t, J=6.6, 4H), and 1.79 (s, 6H)

Preparation Example 12

Synthesis of polyphthalate Poly(FM-2)

FM2 (0.83 mmol) obtained in Preparation Example 2 was dissolved in 4 mL of toluene under nitrogen, and 2.5 mol % second-generation Grubbs catalyst (Grubbs, 1999) was completely dissolved in the resulting solution for 5 min. A reaction material was warmed to 70° C. and stirred at that temperature for 4 days. After the reaction was complete, methanol was added to cause formation of polymer precipitates which were centrifuged to collect primary precipitates. The thus-collected precipitates were dissolved in methylene chloride and filtered to remove impurities, followed by methanol precipitation. This procedure was repeated until a desired purity of a product was obtained, thereby affording Poly(FM-2) as polyphthalate.

Preparation Examples 13 to 17

Synthesis of Polyphthalates Poly(FM-3), Poly(FM-6), Poly(FM-7), Poly(FM-9), and Poly(FM-10)

Polyphthalates Poly(FM-3), Poly(FM-6), Poly(FM-7), Poly(FM-9), and Poly(FM-10) were synthesized in the same manner as in Preparation Example 12, except that each of FM-3, FM-6, FM-7, FM-9, and FM-10 instead of FM-2 as a monomer was dissolved in toluene.

Preparation Example 18

Synthesis of Polyphthalate Poly(FM-3+FM-7)

Polyphthalate Poly(FM-3+FM-7) was synthesized in the same manner as in Preparation Example 12, except that FM-3 (0.41 mmol) and FM-10 (0.41 mmol) were dissolved in 4 mL of toluene.

Preparation Example 19

Synthesis of Polyphthalate Poly(FM-3+FM-10)

Polyphthalate Poly(FM-3+FM-10) was synthesized in the same manner as in Preparation Example 12, except that FM-3 (0.41 mmol) and FM-10 (0.41 mmol) were dissolved in 4 mL of toluene.

Examples 1 to 19

1-vinyl-2-pyrrolidinone (3.33 g, 30 mmol), N,N'-methylenebisacrylamide (31 mg, 0.2 mmol), 1-methyl-2-pyrrolidinone (0.99 g, 10 mmol), ammonium persulfate (4.6 mg, 0.02 mmol), N,N,N',N'-tetramethylethylenediamine (1.2 mg, 0.01 mmol), tetrabutylammonium perchlorate (0.2 mmol), and each of the monomers or polymers (0.10 g) synthesized in Preparation Example 1 to 19 were mixed, coated on a transparent substrate, and heat-treated at 40° C. for 15 hours.

Next, a spacer capable of maintaining a cell gap was disposed between an ITO transparent electrode with adsorption of the thus-prepared electrochromic material and another ITO glass as a counter electrode. Thereafter, a solution of 0.2 M tetrabutylammonium hexafluorophosphate or LiClO$_4$ in gamma butyrolactone (GBL) as an electrolyte was infected into the resulting electrode assembly, followed by sealing to fabricate an electrochromic device.

Synthesis Example

Synthesis of Linker (1) Synthesis of Diethyl Allylphosphonate

Allyl bromide (3.6 g, 30.09 mmol) and triethyl phosphite (1 g, 6 mmol) were dissolved and reacted in chloroform (30 mL). Then, the resulting reaction solution was refluxed for 12 hours, cooled to room temperature and filtered through a glass filter. Chloroform was completely removed from the solution under vacuum to thereby give an oily compound as the title compound. The $^1$H NMR and $^{13}$CNMR results of the compound thus obtained are given as follows.

$^1$H NMR (300 MHz, CDCl$_3$)
δ 5.71 (1H, m), 5.14 (2H, m), 4.01 (4H, m), 2.52 (2H, dd, J=22, 7.2 Hz), and 1.21 (6H, m) ppm
$^{13}$CMMR (75 MHz, CDCl$_3$)
δ 127.7, 127.6, 120.2, 120.0, 62.2, 62.1, 32.9, 31.0, 16.7, and 16.6

(2) Synthesis of diethyl but-3-enylphosphonate 1-bromo-3-butene (39.0 mmol) and triethyl phosphite (1 g, 6 mmol) were dissolved and reacted in CHCl$_3$ (30 mL). Then, the reaction solution was refluxed for 12 hours, cooled to room temperature and filtered through a glass filter. Chloroform (CHCl$_3$) was completely removed from the solution under vacuum to thereby give an oily compound as the title compound. The $^1$H NMR results of the compound thus obtained are given as follows.

$^1$H NMR (300 MHz, CDCl$_3$)
δ 5.86-5.75 (m, 4H), 5.14-4.95 (t, 2H), 4.08-4.02 (q, J=1.5 Hz, 4H), 2.4-2.2 (2H), 1.86-1.72 (2H), and 1.32 (t, J=3 Hz, 6H)

(3) Synthesis of Linker 1 (Allylphosphonic Acid)

Diethyl allylphosphonate (2 g, 11.2 mmol) prepared in Section (1) was dissolved in a hydrochloric acid solution (20 mL, 6 mol). Then, the reaction solution was refluxed for 15 hours, and cooled to room temperature. A solvent was completely removed from the reaction solution under vacuum to thereby give allylphosphonic acid. The $^1$H NMR results of the compound thus obtained are given as follows.

$^1$H NMR (300 MHz, acetone-d$_6$)
δ 5.83 (1H, m), 5.20 (2H, m), 2.65 (2H, dd, J=22, 7.5 Hz), 1.66 (1H, d, J=6.6 Hz), and 1.30 (1H, d, J=4.5 Hz) ppm

Examples 20 to 38

0.25 g of a TiO$_2$ nanoparticle powder, 0.060 g of carbowax, 0.5 mL of terpineol, and 0.5 mL of ethanol were mixed to prepare a paste. Then, the resulting paste was patterned on an ITO transparent electrode to form a film, followed by heat treatment at 150° C. for 1 hour and then at 450° C. for another 2 hours to thereby prepare a TiO$_2$ nanocrystalline layer.

An ITO transparent electrode with introduction of the thus-prepared TiO$_2$ film was dipped in a solution of the linker 1 of Section (3) in acetonitrile for 12 hours, taken out and dried.

On the other hand, a second-generation Grubbs catalyst (Grubbs, 1999) was dissolved in toluene to which the above-dried ITO transparent electrode was then dipped. Thereafter, the phthalate compounds FM-1 to FM-11 prepared in Preparation Examples 1 to 19, and previous polymerization products thereof, e.g. polyphthalates Poly(FM-3), Poly(FM-6), Poly(FM-7), Poly(FM-9), Poly(FM-10), Poly(FM-3+FM-7) and Poly(FM-3+FM-10), were added thereto, respectively and reacted at 70° C. for 48 hours. After the reaction was complete, the ITO transparent electrode was taken out, washed and dried.

Next, a spacer capable of maintaining a cell gap was disposed between the ITO transparent electrode with adsorption of the thus-prepared electrochromic material and another ITO glass as a counter electrode. Thereafter, a solution of 0.2 M tetrabutylammonium hexafluorophosphate or LiClO$_4$ in gamma butyrolactone (GBL) as an electrolyte was injected into the resulting electrode assembly, followed by sealing to fabricate an electrochromic device.

Changes of Color in Electrochromic Devices

With application of a voltage of 4.5 V, color changes were observed in the electrochromic devices prepared in Examples 1 to 19. The results thus obtained are given in Table 1 below.

TABLE 1

| Example No. | Compounds | Color changes |
|---|---|---|
| 1 | FM1 | Violet |
| 2 | FM2 | Violet |
| 3 | FM3 | Violet |
| 4 | FM4 | Violet |
| 5 | FM5 | Yellow |
| 6 | FM6 | Yellow |
| 7 | FM7 | Yellow |
| 8 | FM8 | Reddish-Organge |
| 9 | FM9 | Reddish-Organge |
| 10 | FM10 | Reddish-Organge |
| 11 | FM11 | Violet |
| 12 | Poly(FM2) | Violet |
| 13 | Poly(FM3) | Violet |
| 14 | Poly(FM6) | Yellow |
| 15 | Poly(FM7) | Yellow |
| 16 | Poly(FM9) | Reddish-Organge |
| 17 | Poly(FM10) | Reddish Organge |
| 18 | Poly(FM3 + FM7) | Reddish-Organge |
| 19 | Poly(FM3 + FM10) | Violet-Organge |

Referring to Table 1, it can be seen that the electrochromic device in accordance with Example embodiments employs a phthalate compound in the form of a solid phase material as an electrochromic material, and further enables successful achievement of red electrochromic behavior in addition to realization of blue and yellow colors.

As described above, although example embodiments have been disclosed for illustrative purposes, those skilled in the art will appreciate that various modifications, additions and substitutions are possible, without departing from the scope and spirit of the accompanying claims.

What is claimed is:

1. An electrochromic device comprising a pair of a transparent electrode and an opposite electrode being disposed opposite to each other, and an electrochromic material and an electrolyte between the transparent electrode and the opposite electrode, wherein the electrochromic material includes polyphthalate, wherein the polyphthalate is formed by polymerization of one or more ortho, meta or para-phthalate compounds comprising at least two terminal double bonds represented by Formula 1:

(Formula 1)

wherein $R_1$, $R_2$, $R_3$ and $R_4$ are independently hydrogen, hydroxy, linear, branched or cyclic $C_1$-$C_{10}$ alkyl, $C_1$-$C_{10}$ alkoxyalkyl, linear, branched or cyclic $C_1$-$C_{10}$ alkoxy, $C_6$-$C_{12}$ aryl, $C_2$-$C_{12}$ heteroaryl, nitro, or amino, and $n_1$ and $n_2$ are each an integer of 1 to 10.

2. The electrochromic device according to claim 1, wherein the electrochromic device includes the transparent electrode having a conductive film formed on a transparent substrate, the opposite electrode disposed opposite to the transparent electrode and having a conductive film formed on a substrate, the electrochromic layer of a polyphthalate electrochromic material formed on the transparent electrode, and the electrolyte interposed between the transparent electrode and the opposite electrode.

3. The electrochromic device according to claim 2, wherein the electrochromic layer includes a nanocrystalline layer composed of a plurality of nanocrystalline particles on the conductive film and polyphthalate electrochromic materials adsorbed to surfaces of the nanocrystalline particles.

4. The electrochromic device according to claim 3, wherein the polyphthalate electrochromic materials are adsorbed, coated, supported or attached to the surfaces of the nanocrystalline particles by a linker.

5. The electrochromic device according to claim 4, wherein the linker includes one or more of the following functional group:

phosphonic acid, acetic acid, sulfonic acid, catechol or any combination thereof.

6. The electrochromic device according to claim 5, wherein the linker includes one of the compounds represented by Formula 4:

(Formula 4)

wherein $n_3$ is an integer of 1 to 5.

7. The electrochromic device according to claim 3, wherein the nanocrystalline particles are titanium dioxide (TiO$_2$), zinc oxide (ZnO), tungsten oxide (WO), or a mixture thereof.

8. The electrochromic device according to claim 3, wherein a size of the nanocrystalline particles is in a range of 0.5 to 500 nm.

9. The electrochromic device according to claim 3, wherein a thickness of the electrochromic layer is in a range of 0.1 to 20 μm.

10. The electrochromic device according to claim 1, wherein the phthalate compound is represented by one of the compounds of Formula 2:

(Formula 2)

11. The electrochromic device according to claim 1, wherein the polyphthalate is represented by Formula 3:

(Formula 3)

wherein $R_1$, $R_2$, $R_3$ and $R_4$ are independently hydrogen, hydroxy, linear, branched or cyclic $C_1$-$C_{10}$ alkyl, $C_1$-$C_{10}$ alkoxyalkyl, linear, branched or cyclic $C_1$-$C_{10}$ alkoxy, $C_6$-$C_{12}$ aryl, $C_2$-$C_{12}$ heteroaryl, nitro, or amino, $n_1$ and $n_2$ are each an integer of 1 to 10, and
$n_3$ is an integer of 1 to 1000.

12. The electrochromic device according to claim 1, wherein a weight average molecular weight of the polyphthalate is in a range of $10^2$ to $10^7$ Da.

13. The electrochromic device according to claim 1, further comprising a reflective layer formed on the opposite electrode.

* * * * *